(12) United States Patent
Zhang

(10) Patent No.: US 12,233,914 B2
(45) Date of Patent: Feb. 25, 2025

(54) AUTOMATIC DRIVING-BASED RIDING METHOD, APPARATUS AND DEVICE, AND STORAGE MEDIUM

(71) Applicant: BEIJING BAIDU NETCOM SCIENCE AND TECHNOLOGY CO., LTD., Beijing (CN)

(72) Inventor: Xin Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/796,074

(22) PCT Filed: Jan. 30, 2022

(86) PCT No.: PCT/CN2022/075164
§ 371 (c)(1),
(2) Date: Jul. 28, 2022

(87) PCT Pub. No.: WO2022/257488
PCT Pub. Date: Dec. 15, 2022

(65) Prior Publication Data
US 2024/0166243 A1    May 23, 2024

(30) Foreign Application Priority Data

Jun. 9, 2021   (CN) .......................... 202110643898.4

(51) Int. Cl.
*B60W 60/00*        (2020.01)

(52) U.S. Cl.
CPC . *B60W 60/00253* (2020.02); *B60W 2420/403* (2013.01); *B60W 2556/10* (2020.02); *B60W 2556/40* (2020.02); *B60W 2556/45* (2020.02)

(58) Field of Classification Search
CPC ..... B60W 60/00253; B60W 2420/403; B60W 2556/10; B60W 2556/40; B60W 2556/45;
(Continued)

(56) References Cited

U.S. PATENT DOCUMENTS

| 9,910,438 B1 * | 3/2018 | Arden .................. G05D 1/0212 |
| 2015/0219464 A1 | 8/2015 | Beaurepaire et al. |

(Continued)

FOREIGN PATENT DOCUMENTS

| CN | 105677793 A * | 6/2016 | ............. G06F 17/27 |
| CN | 106843219 A | 6/2017 | |

(Continued)

OTHER PUBLICATIONS

C. Qiao, M. Lu, Y. Zhang and K. N. Brown, "An Efficient Dispatch and Decision-Making Model for Taxi-Booking Service," 2015 IEEE 12th Intl Conf on Ubiquitous Intelligence and Computing and 2015 IEEE 12th Intl Conf on Autonomic and Trusted Computing and 2015 IEEE 15th Intl Conf on Scalable Computing (Year: 2015).*

(Continued)

*Primary Examiner* — Elaine Gort
*Assistant Examiner* — Brittany Renee Peko
(74) *Attorney, Agent, or Firm* — NORTON ROSE FULBRIGHT US LLP

(57) ABSTRACT

Provided are an automatic driving-based riding method, apparatus and device, and a storage medium. The automatic driving-based riding method includes: selecting a target pick-up point for a target passenger from candidate pick-up points according to vehicle auxiliary information of the candidate pick-up points, where the vehicle auxiliary information of the candidate pick-up points includes coordinate information and lane information of the candidate pick-up points; and controlling an automatic driving vehicle to drive (Continued)

to the target pick-up point according to the vehicle auxiliary information of the target pick-up point.

17 Claims, 8 Drawing Sheets

(58) Field of Classification Search
CPC .. B60W 40/02; B60W 60/00; B60W 2552/53; B60W 2554/4041; B60W 2756/10
See application file for complete search history.

(56) References Cited

U.S. PATENT DOCUMENTS

| | | | |
|---|---|---|---|
| 2018/0082135 A1* | 3/2018 | Crawford | G06K 9/00791 |
| 2020/0124428 A1* | 4/2020 | Hamilton | G01C 21/3438 |
| 2020/0298868 A1* | 9/2020 | Kaneichi | B60W 50/00 |
| 2021/0035450 A1 | 2/2021 | Gao et al. | |
| 2022/0221867 A1* | 7/2022 | Taveira | G05D 1/0214 |

FOREIGN PATENT DOCUMENTS

| | | | | |
|---|---|---|---|---|
| CN | 109115237 A | | 1/2019 | |
| CN | 109445434 A | * | 3/2019 | G05D 1/02 |
| CN | 111859180 A | | 10/2020 | |
| CN | 111931079 A | * | 11/2020 | G06F 16/9537 |
| CN | 112686461 A | * | 4/2021 | G06F 16/29 |
| CN | 113276888 A | | 8/2021 | |
| JP | 2008268080 A | | 11/2008 | |
| JP | 2018156436 A | | 10/2018 | |
| JP | 2020030495 A | | 2/2020 | |
| JP | 2020140262 A | | 9/2020 | |
| JP | 2020154550 A | | 9/2020 | |
| WO | 2019145747 A1 | | 8/2019 | |
| WO | 2020201802 A1 | | 10/2020 | |

OTHER PUBLICATIONS

International Search Report issued in PCT/CN2022/075164 on Apr. 26, 2022.

Office Action issued on Mar. 29, 2022 by the CIPO in the corresponding Patent Application No. 202110643898.4, with English translation.

Search Report issued on Mar. 29, 2022 by the CIPO in the corresponding Chinese Patent Application No. 202110643898.4.

Office Action issued on Oct. 16, 2023 by the CIPO in the corresponding Patent Application No. 2022-551665, with English translation.

Office Action issued on Apr. 18, 2024 by the KIPO in the corresponding Patent Application No. 10-2022-7029593, with English translation.

\* cited by examiner

AUTOMATIC DRIVING-BASED RIDING METHOD, APPARATUS AND DEVICE, AND STORAGE MEDIUM

CROSS REFERENCE TO RELATED APPLICATIONS

This application is a national phase under 35 U.S.C. § 371 of International Application No. PCT/CN2022/075164 filed on Jan. 30, 2022, which claims the benefit of priority from Chinese Patent Application 202110643898.4 filed on Jun. 9, 2021. The entire contents of these applications are incorporated herein by reference in their entirety.

TECHNICAL FIELD

The present disclosure relates to the technical field of computers, and particularly, to the technical field of automatic driving and deep learning, and specifically, to an automatic driving-based riding method, apparatus and device, and a storage medium.

BACKGROUND

An automatic driving vehicle can realize an unmanned driving by adopting an automatic driving technology through a computer system. Currently, the automatic driving technology adopted by the automatic driving vehicle may be divided into five levels of L1-L5. As the level rises, the automatic driving function is more intelligent.
With the development of the automatic driving technology, numerous science and technology companies are exploring the implementation of a robotaxi. In an automatic driving riding scene, how smoothly the automatic driving vehicle picks up a passenger is the key to order.

SUMMARY

The present disclosure provides an automatic driving-based riding method, apparatus and device, and a storage medium.

An aspect of the present disclosure provides an automatic driving-based riding method. The method includes: selecting a target pick-up point for a target passenger from candidate pick-up points according to vehicle auxiliary information of the candidate pick-up points, where the vehicle auxiliary information of the candidate pick-up points includes coordinate information and lane information of the candidate pick-up points; and controlling an automatic driving vehicle to drive to the target pick-up point according to the vehicle auxiliary information of the target pick-up point.

Another aspect of the present disclosure provides an automatic driving-based riding apparatus. The apparatus includes a target pick-up point selection module and a vehicle control module. The target pick-up point selection module is configured to select a target pick-up point for a target passenger from candidate pick-up points according to vehicle auxiliary information of the candidate pick-up points, where the vehicle auxiliary information of the candidate pick-up points includes coordinate information and lane information of the candidate pick-up points. The vehicle control module is configured to control an automatic driving vehicle to drive to the target pick-up point according to vehicle auxiliary information of the target pick-up point.

Another aspect of the present disclosure provides an electronic device. The electronic device includes at least one processor and a memory. The memory is communicatively connected to the at least one processor, where the memory stores an instruction executable by the at least one processor, and the instruction, when executed by the at least one processor, causes the at least one processor to perform the automatic driving-based riding method provided in any one of the embodiments of the present disclosure.

Another aspect of the present disclosure provides a non-transitory computer readable storage medium storing a computer instruction, where the computer instruction is configured to cause a computer to perform the automatic driving-based riding method provided in any one of the embodiments of the present disclosure.

Another aspect of the present disclosure provides a computer program product. The computer program product includes a computer program, where the computer program, when executed by a processor, implements the automatic driving-based riding method provided in any one of the embodiments of the present disclosure.

According to the technology of the present disclosure, the riding efficiency and the riding success rate in an automatic driving scene may be improved.

It should be understood that the contents described in this section are not intended to identify key or critical features of the embodiments of the present disclosure, nor are they intended to limit the scope of the present disclosure. Other features of the present disclosure will become apparent from following Description.

BRIEF DESCRIPTION OF DRAWINGS

The drawings are used for better understanding this scheme and do not constitute a limitation of the present disclosure, in which.

DETAILED DESCRIPTION

Exemplary embodiments of the present disclosure are described below in conjunction with the accompanying drawings, various details of embodiments of the present disclosure are included to assist in understanding, and are to be regarded as exemplary merely. Accordingly, it will be recognized by those of ordinary skill in the art that various changes and modifications may be made to the embodiments described herein without departing from the scope and spirit of the present disclosure. Also, descriptions of well-known functions and structures are omitted from the following description for clarity and conciseness.

The scheme provided in the embodiments of the present disclosure is described in detail below in conjunction with the accompanying drawings.

Figure 1:
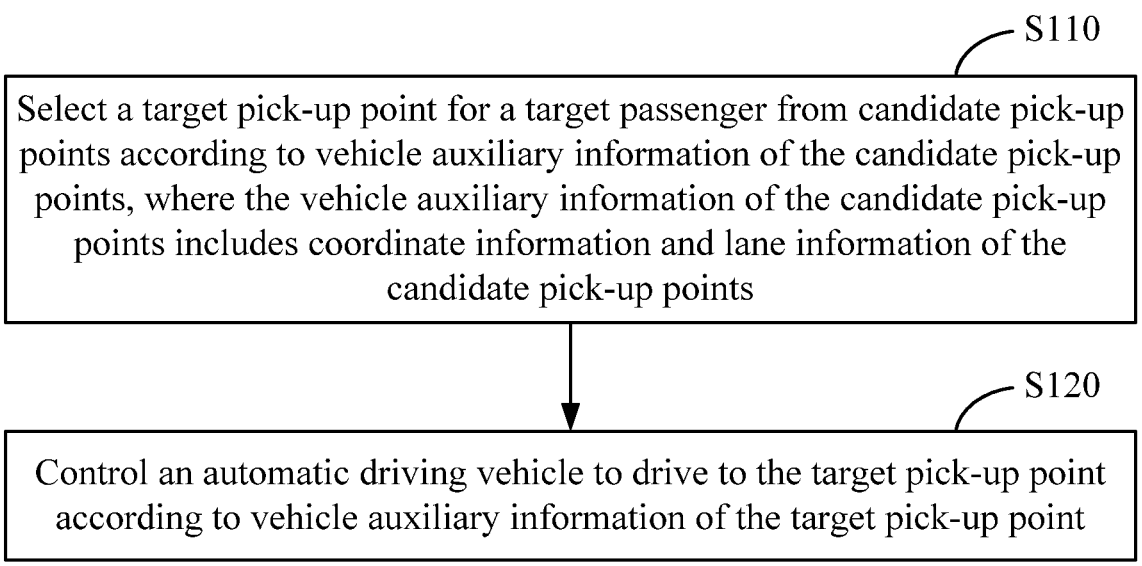
FIG. 1 is a schematic diagram of an automatic driving-based riding method provided according to an embodiment of the present disclosure.

FIG. 1 is a schematic diagram of an automatic driving-based riding method provided according to an embodiment of the present disclosure. The embodiment of the present disclosure is applicable to a case of riding an automatic driving vehicle. The method may be executed by an automatic driving-based riding apparatus, the apparatus may be implemented in a hardware and/or software manner, and the apparatus may be configured in an electronic device. Referring to FIG. 1, the method specifically includes the following.

In S110, a target pick-up point is selected for a target passenger from candidate pick-up points according to vehicle auxiliary information of the candidate pick-up points. Where the vehicle auxiliary information of the candidate pick-up points includes coordinate information and lane information of the candidate pick-up points.

In S120, an automatic driving vehicle is controlled to drive to the target pick-up point according to vehicle auxiliary information of the target pick-up point.

In the embodiments of the present disclosure, the pick-up point refers to a docking point of the passenger with the automatic driving vehicle, i.e., the passenger gets up at the pick-up point, for example, the automatic driving vehicle may wait for the passenger to get up at the pick-up point, and the passenger may also wait for the automatic driving vehicle at the pick-up point.

The candidate pick-up point refers to a pick-up point available to the passenger. The candidate pick-up point may include vehicle auxiliary information and semantic description information, the vehicle auxiliary information faces the automatic driving vehicle, for the automatic driving vehicle to drive to the candidate pick-up point according to the vehicle auxiliary information, and an error of the coordinate information in the vehicle auxiliary information may be at a centimeter level, for example, it may be obtained through a high-precision positioning device arranged in the automatic driving vehicle, and the lane information may also be obtained through a high-precision positioning, for example, a third lane of a certain road. The semantic description information faces the passenger, for the passenger to walk to the candidate pick-up point through the semantic description information.

In a case where the target passenger needs to ride the automatic driving vehicle, the target pick-up point may be selected for the target passenger from the candidate pick-up points according to an initial position of the target passenger. Moreover, the vehicle auxiliary information of the target pick-up point may be sent to the automatic driving vehicle, so that the automatic driving vehicle drives to the target pick-up point according to coordinate information and lane information of the target pick-up point, and semantic description information of the target pick-up point may also be sent to the target passenger, so that the target passenger moves from the initial position to the target pick-up point according to the semantic description information.

In a non-automatic driving scene, the vehicle may only obtain the coordinate information of the pick-up point, and an error range of the coordinate information of the pick-up point is large, for example, the coordinate information may be obtained through a global positioning system (GPS) positioning technology instead of a high-precision positioning. In the non-automatic driving scene, the accuracy of the coordinate information of the pick-up point is low, and after the vehicle arrives at the pick-up point, a driver may find an actual riding position of the passenger in a manner of combining a map navigation and the experience general knowledge, observing environment doorplate sign information, calling with passenger voice and the like.

According to the embodiments of the present disclosure, in an automatic driving scene, high-precision coordinate information of the target pick-up point, especially lane information associated with the high-precision coordinate information, is provided for the automatic driving vehicle, so that the automatic driving vehicle may accurately drive to the target pick-up point according to the coordinate information and the lane information of the target pick-up point. The semantic description information of the target pick-up point is provided for the target passenger, so that the target passenger can accurately reach the target pick-up point according to the semantic description information. That is, different requirements of the automatic driving vehicle and the target passenger on the pick-up point may be considered through the vehicle auxiliary information and the semantic description information of the target pick-up point, so that the automatic driving vehicle and the target passenger are moved to the target pick-up point, a problem that the passenger and the automatic driving vehicle are difficult to butt due to a fact that no driver exists in the automatic driving scene may be solved, and therefore the riding efficiency and the riding success rate of the automatic driving scene are improved.

According to the technical schemes of the embodiments of the present disclosure, the high-precision coordinate information and the lane information of the target pick-up point are provided for the target driving vehicle, and the semantic description information of the target pick-up point is provided for the target passenger, so that the automatic driving vehicle and the target passenger accurately move to the target pick-up point, and thus the riding efficiency and the riding success rate of the automatic driving scene may be improved.

Figure 2:
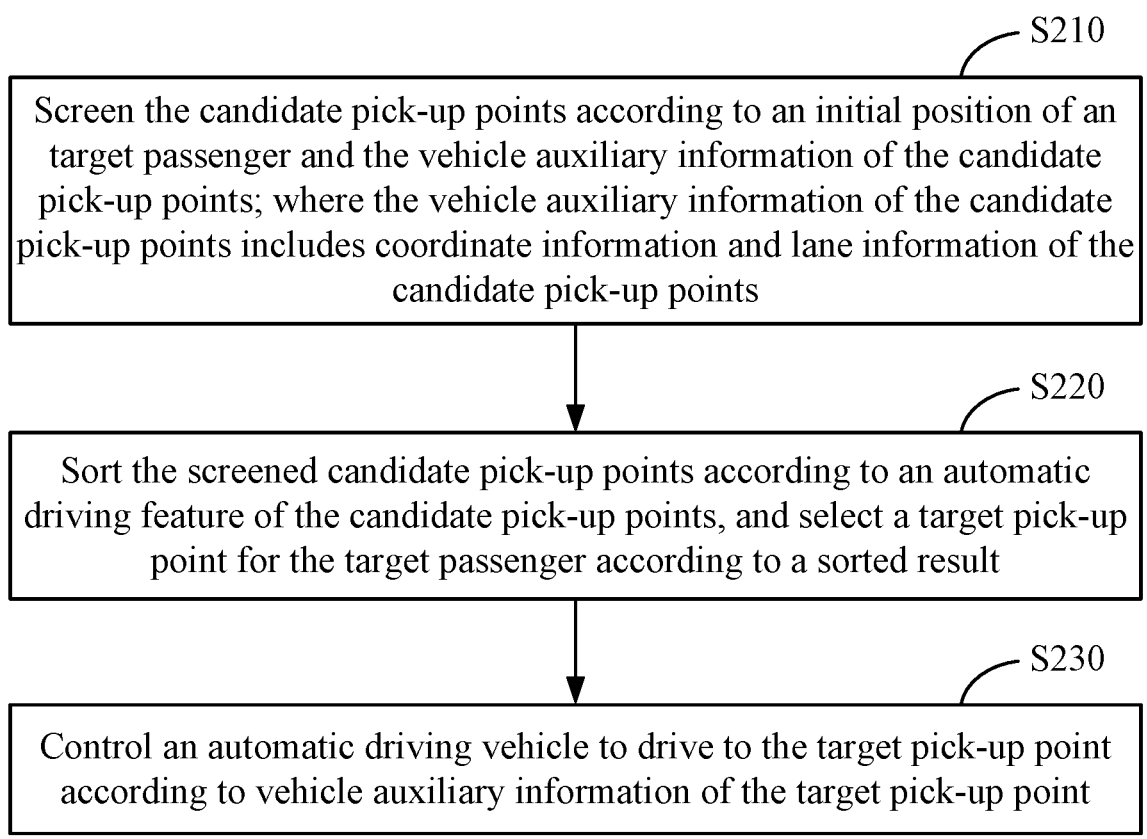
FIG. 2 is a schematic diagram of another automatic driving-based riding method provided according to an embodiment of the present disclosure.

FIG. 2 is a schematic diagram of another automatic driving-based riding method provided according to an embodiment of the present disclosure. This embodiment is an optional scheme proposed on the basis of the embodiments described above. Referring to FIG. 2, the automatic driving-based riding method provided in this embodiment includes the following.

In S210, the candidate pick-up points are screened according to an initial position of an target passenger and the vehicle auxiliary information of the candidate pick-up points. Where the vehicle auxiliary information of the candidate pick-up points includes coordinate information and lane information of the candidate pick-up points.

In S220, the screened candidate pick-up points are sorted according to an automatic driving feature of the candidate pick-up points, and a target pick-up point is selected for the target passenger according to a sorted result.

In S230, an automatic driving vehicle is controlled to drive to the target pick-up point according to vehicle auxiliary information of the target pick-up point.

The automatic driving feature may be determined from historical behavior data of the candidate pick-up point in an automatic driving scene. Specifically, in response to an automatic driving riding request including an initial position of the target passenger, a distance between the target passenger and the candidate pick-up point may be determined according to the initial position of the target passenger, the coordinate information and the lane information of the candidate pick-up points; and the candidate pick-up points are screened according to the distance to obtain at least two screened candidate pick-up points, for example, at most 50 candidate pick-up points within 500 meters of the initial position may be selected. In addition, the candidate pick-up points may be screened by combining the distance, the click rate of the candidate pick-up points and the heat information of the candidate pick-up points, and a probability that the candidate pick-up points are filtered out may be in a negative correlation with the click rate and the heat information of the candidate pick-up points. Before the screened candidate pick-up points are sorted, candidate pick-up points located in a legal automatic driving riding region may be removed, and the legal automatic driving riding region is a legal driving region of an automatic driving riding.

Furthermore, the automatic driving feature of the candidate pick-up points may be introduced to sort the screened candidate pick-up points, and the target pick-up point is selected for the target passenger according to the sorted result. Specifically, a candidate pick-up point with a highest ranking score may be used as the target pick-up point, and candidate pick-up points with a fixed numerical value (such as 3) and with relatively high ranking scores may also be provided to the target passenger, so that the target passenger may select the target pick-up point according to individual requirements. The target pick-up point is selected for the target passenger by combining the initial position of the target passenger, the vehicle auxiliary information and the automatic driving feature of the candidate pick-up point, so that a matching degree of the target pick-up point and the target passenger may be improved, and thus the riding efficiency and the riding success rate of the target passenger are further improved.

In the technical scheme of the present disclosure, acquisition, storage, application and the like of passenger personal information all satisfy the regulations of related laws and regulations, and do not violate the public order.

In an optional implementation, the automatic driving feature includes at least one of: an automatic driving success rate, a road condition complexity, or passenger feedback information.

The automatic driving success rate may refer to a successful docking rate of historical passengers and automatic driving vehicles at the candidate pick-up point, the road condition complexity may be determined according to the grade of surrounding roads, a number of pedestrians, a number of non-motor vehicles and the like, and the passenger feedback information may be evaluation information of the passenger on the riding difficulty degree at the candidate pick-up point.

Specifically, the automatic driving success rate, the road condition complexity and the passenger feedback information of each screened candidate pick-up point may be used as input of a sorting model, and scores, output by the sorting model, of the candidate pick-up points are acquired; and the target pick-up point is selected according to the score. According to the embodiments of the present disclosure, a network structure of the sorting model is not specifically limited, for example, a logistic regression model, a Pairwise model (which is a ranking model), a RankNet model (which is a ranking network model) and the like may be adopted. The screened candidate pick-up points are sorted by introducing the automatic driving success rate, the road condition complexity or the passenger feedback information, a matching degree between the target pick-up point and the automatic driving scene may be further improved, and thus the riding success rate is improved.

According to the technical schemes of the embodiments of the present disclosure, the candidate pick-up points are screened by combining the initial position of the target passenger and the vehicle auxiliary information of the candidate pick-up points, and the screened candidate pick-up points are sorted by introducing the automatic driving success rate, the road condition complexity or the passenger feedback information, so that the feature of an automatic driving riding scene may be fully considered, and thus the riding success rate is further improved.

Figure 3A:
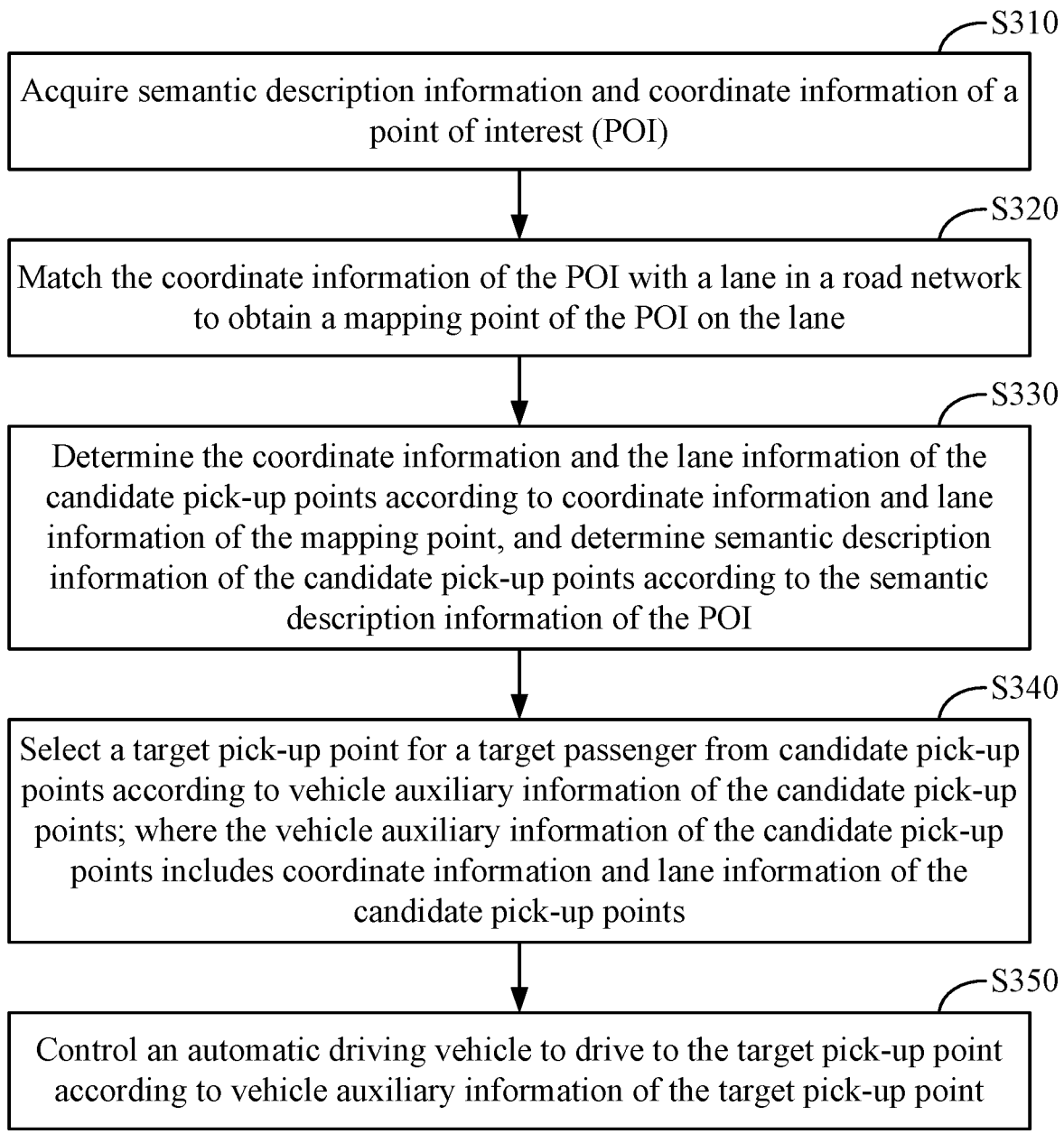
FIG. 3A is a schematic diagram of another automatic driving-based riding method provided according to an embodiment of the present disclosure.

FIG. 3A is a schematic diagram of another automatic driving-based riding method provided according to an embodiment of the present disclosure. This embodiment is an optional scheme proposed on the basis of the embodiments described above. Referring to FIG. 3A, the automatic driving-based riding method provided in this embodiment includes the following.

In S310, semantic description information and coordinate information of a point of interest (POI) are acquired.

In S320, the coordinate information of the POI is matched with a lane in a road network to obtain a mapping point of the POI on the lane.

In S330, the coordinate information and the lane information of the candidate pick-up points are determined according to coordinate information and lane information of the mapping point, and semantic description information of the candidate pick-up points is determined according to the semantic description information of the POI.

In S340, a target pick-up point is selected for a target passenger from candidate pick-up points according to vehicle auxiliary information of the candidate pick-up points; where the vehicle auxiliary information of the candidate pick-up points includes coordinate information and lane information of the candidate pick-up points.

In S350, an automatic driving vehicle is controlled to drive to the target pick-up point according to vehicle auxiliary information of the target pick-up point.

The point of interest (POI) may be a POI that is visible along a street, such as a certain cell east gate, a subway station, a bus stop. The candidate pick-up points are excavated according to the POI being visible along the street, and thus the riding convenience of passengers.

Figure 3B:
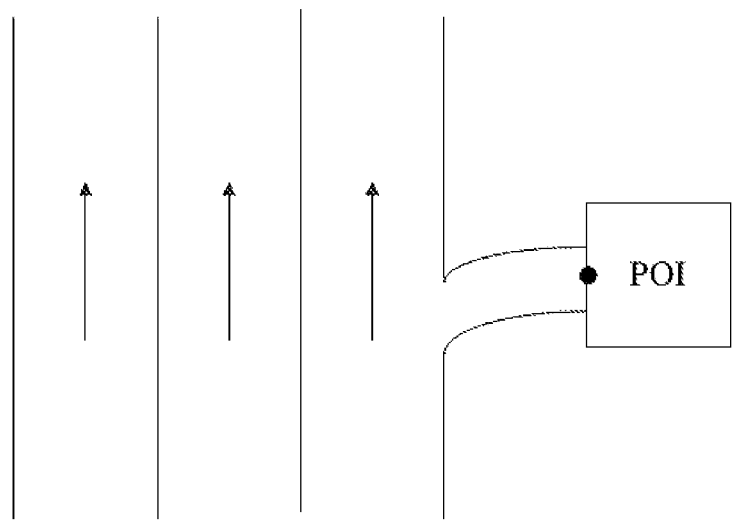
FIGS. 3B to 3D are diagrams showing a mapping point provided according to an embodiment of the present disclosure, respectively.
Figure 3C:
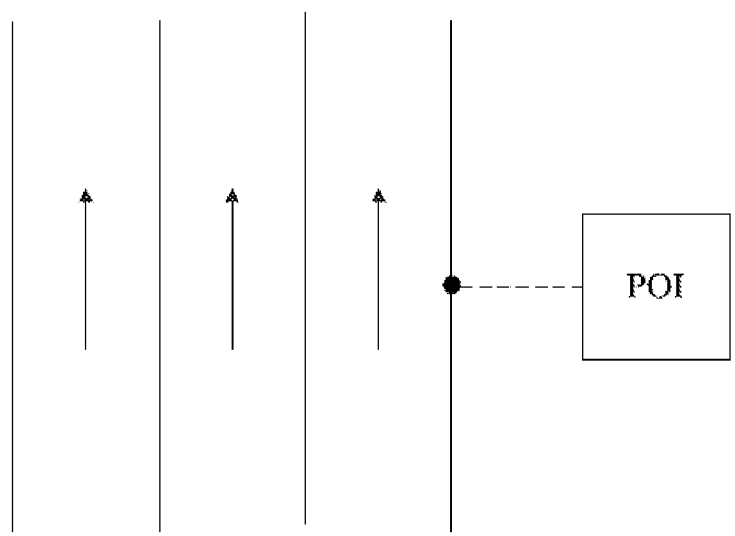

Specifically, the POI is matched with a lane of a road in a road network according to the coordinate information of the POI so as to determine whether the POI is on the lane or not; if the POI is on the lane, then the POI itself serves as the mapping point (refer to FIG. 3B); if the POI is not on the lane, then a point in the lane closest to the POI may be used as the mapping point (referring to FIG. 3C).

Whether the mapping point belongs to a riding prohibition region or not is further determined, in a case where the mapping point does not belong to the riding prohibition region, the mapping point is directly used as the candidate pick-up point, the coordinate information and lane information of the mapping point are used as the coordinate information and the lane information of the candidate pick-up point, and the semantic description information of the POI is adjusted according to the coordinate information of the mapping point and the coordinate information of the POI to obtain the semantic description information of the mapping point (referring to FIG. 3C). Specifically, a relative distance and a direction between a mapping point and a POI may be determined according to the coordinate information of the mapping point and the coordinate information of the POI, and the semantic description information of the candidate pick-up point is obtained according to the relative distance, the direction and the semantic description information of the POI. Referring to FIG. 3C, the semantic description information of the POI is a certain market east gate, while the semantic description information of the candidate pick-up point is 30 meters to the west of a certain market east gate. The mapping point of the POI on the lane is determined, and in a case where the mapping point does not belong to the riding prohibition region, the mapping point serves as the candidate pick-up point, the coordinate information, the lane information and the semantic description information of the candidate pick-up point are obtained, which facilitates the automatic driving vehicle to accurately position the candidate pick-up point according to the coordinate information and the lane information of the candidate pick-up point, and facilitates the passenger to accurately position the candidate pick-up point according to the semantic description information, so that the riding success rate is improved.

In an optional implementation, S330 may include: in a case where the mapping point belongs to a riding prohibition region, correcting the coordinate information and/or the lane information of the mapping point to obtain the coordinate information and/or the lane information of the candidate pick-up points; and adjusting the semantic description information of the POI according to the coordinate information and/or the lane information of the candidate pick-up points to obtain the semantic description information of the candidate pick-up points.

Figure 3D:
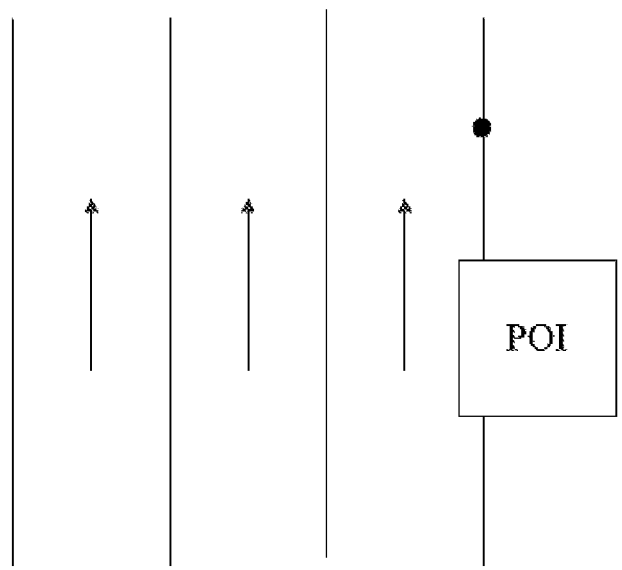

In a case where the mapping point belongs to the riding prohibition region, the coordinate information and/or the lane information of the mapping point may be corrected to obtain a correction point of the mapping point in an available riding region, the correction point serves as the candidate pick-up point, and the coordinate information and the lane information of the correction point serve as the coordinate information and the lane information of the candidate pick-up point, and the semantic description information of the POI is adjusted according to the coordinate information and the lane information of the candidate pick-up point to obtain the semantic description information of the candidate pick-up point. Referring to FIG. 3D, the semantic description information of the POI is a certain bus station on a certain road, and since the bus station is the riding prohibition region of the automatic driving vehicle, the semantic description information of the candidate pick-up point may be 30 meters north of a certain bus station on a certain road, and the lane information of the candidate pick-up point may be a third lane on a certain road. In a case where the mapping point belongs to the riding prohibition region, the correction point of the mapping point except for the riding prohibition region may be determined, and the correction point serves as the candidate pick-up point, so that the riding success rate may be improved, the automatic driving vehicle may be prevented from violating the law in the getting-on process at the candidate pick-up point, and thus the stability is improved.

In an optional implementation, before the target pick-up point is selected for the target passenger from the candidate pick-up points, the method further includes: acquiring coordinate information and semantic description information of a historical pick-up point of a historical passenger, and a movement track of the historical passenger before a riding in a non-automatic driving scene; correcting the coordinate information of the historical pick-up point according to the movement track, and determining the coordinate information and the lane information of the candidate pick-up points according to a corrected result; and adjusting the semantic description information of the historical pick-up point according to the coordinate information of the candidate pick-up points to obtain semantic description information of the candidate pick-up points.

In the embodiments of the present disclosure, historical pick-up points in the non-automatic driving scene may also be employed to excavate candidate pick-up points in the automatic driving scene. Because historical pick-up point coordinates in the non-automatic driving scene are obtained through a positioning device of the historical passengers or drivers instead of a high-precision positioning, and a positioning error is in the magnitude of meters or hectometers. The actual pick-up point coordinates of the historical passengers and the lanes corresponding to the actual pick-up point coordinates are speculated according to the moving tracks (such as walking tracks) of the historical passengers before the riding, and the actual pick-up point coordinates and the lanes corresponding to the actual pick-up point coordinates serve as the coordinate information and the lane information of the candidate pick-up points, so that the positioning accuracy of the candidate pick-up points can satisfy the high-accuracy positioning requirement of the automatic driving vehicle; and the automatic driving vehicle can conveniently and accurately position the candidate pick-up point.

In an optional implementation mode, before the target pick-up point is selected for the target passenger from the candidate pick-up points, the method further includes: using an actual pick-up point of a historical passenger in an automatic driving riding scene as the candidate pick-up points, and obtaining the coordinate information, the lane information and semantic description information of the candidate pick-up points.

In the embodiments of the present disclosure, since the automatic driving vehicle is provided with the high-precision positioning device, in a process of riding the automatic driving vehicle by the historical passenger, the coordinate information and the lane information of the actual pick-up point of the historical passenger may be collected through the high-precision positioning device, and the actual pick-up point may be used as the candidate pick-up point. In addition, semantic description information of the actual pick-up point may be determined according to the coordinate information of the actual pick-up point, a relation between the lane information and the POI coordinates. Actual pick-up points of historical passengers collected by the high-precision positioning device serve as the candidate pick-up points, so that the automatic driving vehicle can accurately position the candidate pick-up points conveniently, and thus the riding success rate may be improved.

According to the technical schemes of the embodiments of the present disclosure, the candidate vehicle points in the automatic driving riding scene are excavated according to the POI information, the coordinate information of the historical passenger points in the non-automatic driving scene, the movement trajectory of the historical passenger before the riding, and the actual pick-up points of historical passengers in automatic driving riding scene, so that the coordinate information and the lane information of the candidate pick-up points with a high precision may be obtained, the semantic description information of the candidate pick-up points may also be obtained, and the automatic driving vehicle and passengers can conveniently and accurately position the candidate pick-up points, whereby the riding success rate and the riding efficiency in an automatic driving scene are improved.

Figure 4:
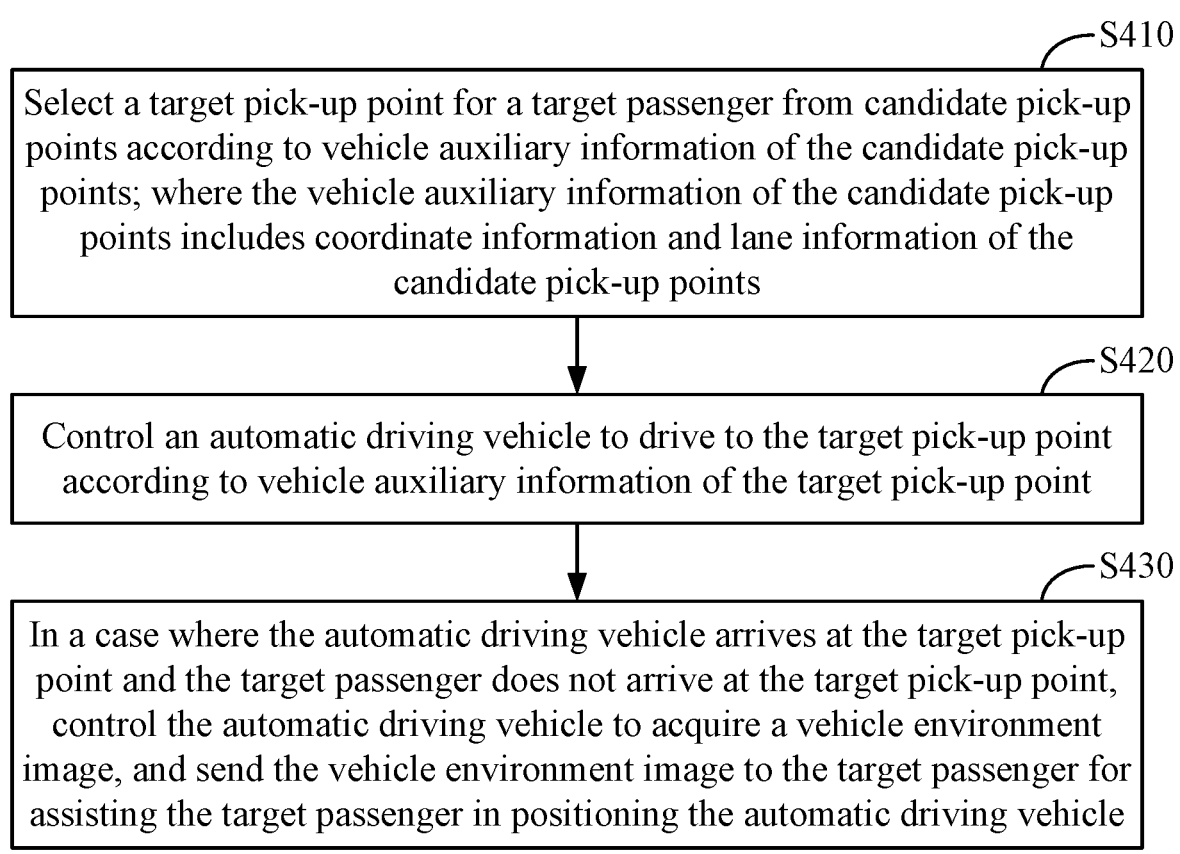
FIG. 4 is a schematic diagram of another automatic driving-based riding method provided according to an embodiment of the present disclosure.

FIG. 4 is a schematic diagram of another automatic driving-based riding method provided according to an embodiment of the present disclosure. This embodiment is an optional scheme proposed on the basis of the embodiments described above. Referring to FIG. 4, the automatic driving-based riding method provided in this embodiment includes the following.

In S410, a target pick-up point is selected for a target passenger from candidate pick-up points according to vehicle auxiliary information of the candidate pick-up points; where the vehicle auxiliary information of the candidate pick-up points includes coordinate information and lane information of the candidate pick-up points.

In S420, an automatic driving vehicle is controlled to drive to the target pick-up point according to vehicle auxiliary information of the target pick-up point.

In S430, in a case where the automatic driving vehicle arrives at the target pick-up point and the target passenger does not arrive at the target pick-up point, the automatic driving vehicle is controlled to acquire a vehicle environment image, and the vehicle environment image is sent to the target passenger for assisting the target passenger in positioning the automatic driving vehicle.

In an actual riding process of passengers, when the automatic driving vehicle arrives at the target pick-up point, it can check whether the target passenger has arrived at the target pick-up point. Specifically, it can check whether the target passenger has traveled or acquired a vehicle environment image through the image acquisition device of the automatic driving vehicle, and whether the target passenger has arrived is determined through the face recognition technology. In a case that the target passenger does not arrive at the target riding station, a vehicle environment image may be sent to the electronic device held by the target passenger, so that the target passenger may determine the actual position of the automatic driving vehicle according to the vehicle environment image, so that the target passenger can position the automatic driving vehicle accurately and quickly.

In an optional implementation, after the automatic driving vehicle is controlled to drive to the target pick-up point according to the vehicle auxiliary information of the target pick-up point, the method further includes: in a case where the automatic driving vehicle arrives at the target pick-up point and the target passenger does not arrive at the target pick-up point, the automatic driving vehicle is controlled to interact with the target passenger, and a candidate instruction is generated according to interaction information; inquiry information about whether to execute the candidate instruction is sent to the target passenger; and after the target passenger confirms that the candidate instruction is executed, the automatic driving vehicle is controlled to execute the candidate instruction to adjust position information of the automatic driving vehicle.

In the embodiments of the present disclosure, in the case where the automatic driving vehicle arrives at the target pick-up point and the target passenger does not arrive at the target pick-up point, the automatic driving vehicle may also interact with the user, for example, may perform a voice interaction, a video call interaction, relative position information between the automatic driving vehicle and the target passenger is determined according to the interactive information, for example, a relative distance and a relative orientation are determined, and a candidate instruction for the automatic driving vehicle is generated according to the relative position information, and after the target passenger confirms the candidate instruction, the automatic driving vehicle is controlled to perform the candidate instruction so as to adjust the actual position information of the automatic driving vehicle. The embodiments of the present disclosure do not concretely limit the candidate instruction, for example, the candidate instruction may be an adjustment of the opposite side of the road, a U-turn, and the like.

In a process of riding, the candidate instruction is generated according to the interaction information between the automatic driving vehicle and the target passenger, and the automatic driving vehicle is controlled to execute the candidate instruction according to the confirmation information of the target passenger on the candidate instruction, it is particularly suitable for controlling a position of the automatic driving vehicle to be adjusted after the target passenger finds the automatic driving vehicle, so that the problems of inaccurate target pick-up point, positioning travel deviation of the target passenger and the like are solved, the riding convenience and the riding flexibility of the target passenger may be improved, and thus the riding success rate may be further improved.

According to the technical scheme of the embodiments of the present disclosure, after the automatic driving vehicle arrives at the target pick-up point, the vehicle environment image is sent to the target passenger, or the automatic driving vehicle is controlled according to the confirmation information of the target passenger on the candidate instruction to adjust the actual position information of the automatic driving vehicle, so that the automatic driving vehicle and the target passenger in a close distance can be accurately recommended, and thus the success rate of the target passenger arriving at the automatic driving vehicle is improved.

Figure 5:
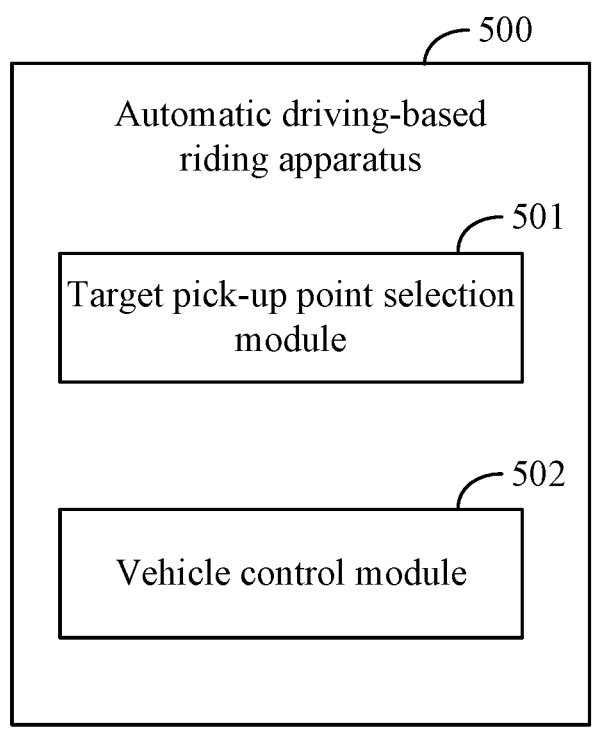
FIG. 5 is a schematic diagram of an automatic driving-based riding apparatus provided according to an embodiment of the present disclosure.

FIG. 5 is a schematic diagram of an automatic driving-based riding apparatus provided according to an embodiment of the present disclosure. This embodiment is applicable to a case of riding an automatic driving vehicle, this apparatus is configured in an electronic device, so that the automatic driving-based riding method described in any of the embodiments of the present disclosure may be implemented. Referring to FIG. 5, the automatic driving-based riding apparatus 500 specifically includes a target pick-up point selection module 501 and a vehicle control module 502. The target pick-up point selection module 501 is configured to select a target pick-up point for a target passenger from candidate pick-up points according to vehicle auxiliary information of the candidate pick-up points; where the vehicle auxiliary information of the candidate pick-up points includes coordinate information and lane information of the candidate pick-up points. The vehicle control module 502 is configured to control an automatic driving vehicle to drive to the target pick-up point according to vehicle auxiliary information of the target pick-up point.

In an optional implementation, the target pick-up point selection module 501 includes a target pick-up point screening unit and a target pick-up point sorting unit. The target pick-up point screening unit is configured to screen the candidate pick-up points according to an initial position of the target passenger and the vehicle auxiliary information of the candidate pick-up points. The target pick-up point sorting unit is configured to sort the screened candidate pick-up points according to an automatic driving feature of the candidate pick-up points, and select the target pick-up point for the target passenger according to a sorted result.

In an optional implementation, the automatic driving feature includes at least one of: an automatic driving success rate, a road condition complexity, or passenger feedback information.

In an optional implementation, the automatic driving-based riding apparatus 500 further includes a first candidate pick-up point module, and the first candidate pick-up point module includes a POI information acquisition unit, a POI matching unit and a first candidate pick-up point unit. The POI information acquisition unit is configured to acquire semantic description information and coordinate information of a point of interest (POI). The POI matching unit is configured to match the coordinate information of the POI with a lane in a road network to obtain a mapping point of the POI on the lane. The first candidate pick-up point unit is configured to determine the coordinate information and the lane information of the candidate pick-up points according to coordinate information and lane information of the mapping point, and determine semantic description information of the candidate pick-up points according to the semantic description information of the POI.

In an optional implementation, the first candidate pick-up point unit is specifically configured to correct the coordinate information and/or the lane information of the mapping point to obtain the coordinate information and/or the lane information of the candidate pick-up points; and adjust the semantic description information of the POI according to the coordinate information and/or the lane information of the candidate pick-up points to obtain the semantic description information of the candidate pick-up points in a case where the mapping point belongs to a riding prohibition region.

In an optional implementation, the automatic driving-based riding apparatus 500 further includes a second candidate pick-up point module. The second candidate pick-up point module includes a historical passenger information unit, a coordinate correction unit and a second candidate pick-up point unit. The historical passenger information unit is configured to acquire, in a non-automatic driving scene, coordinate information and semantic description information of a historical pick-up point of a historical passenger, and a movement track of the historical passenger before a riding. The coordinate correction unit is configured to correct the coordinate information of the historical pick-up point according to the movement track, and determine the coordinate information and the lane information of the candidate pick-up points according to a corrected result. The second candidate pick-up point unit is configured to adjust the semantic description information of the historical pick-up point according to the coordinate information of the candidate pick-up points to obtain semantic description information of the candidate pick-up points.

In an optional implementation, the automatic driving-based riding apparatus 500 further includes a third candidate pick-up point module, and the third candidate pick-up point module is configured to: use an actual pick-up point of a historical passenger in an automatic driving riding scene as the candidate pick-up points, and obtain the coordinate information, the lane information and semantic description information of the candidate pick-up points.

In an optional implementation, the automatic driving-based riding apparatus 500 further includes an environment image sending module, and the environment image sending module is configured to, in a case where the automatic driving vehicle arrives at the target pick-up point and the target passenger does not arrive at the target pick-up point, control the automatic driving vehicle to acquire a vehicle environment image, and send the vehicle environment image to the target passenger for assisting the target passenger in positioning the automatic driving vehicle.

In an optional implementation, the automatic driving-based riding apparatus 500 further includes an interaction module, and the interaction module includes an instruction generation unit, an inquiry unit and an instruction execution unit. The instruction generation unit is configured to, in a case where the automatic driving vehicle arrives at the target pick-up point and the target passenger does not arrive at the target pick-up point, control the automatic driving vehicle to interact with the target passenger, and generate a candidate instruction according to interaction information. The inquiry unit is configured to send inquiry information about whether to execute the candidate instruction to the target passenger. The instruction execution unit is configured to, after the target passenger confirms that the candidate instruction is executed, control the automatic driving vehicle to execute the candidate instruction to adjust position information of the automatic driving vehicle.

According to the technical scheme of this embodiment, candidate pick-up points with high-precision coordinate information and lane information are excavated aiming at an automatic driving riding scene, the candidate pick-up points also have semantic description information facing passengers, and the riding success rate and the riding efficiency in the automatic driving scene can be achieved; and after the automatic driving vehicle reaches the target pick-up point, the automatic driving vehicle may be controlled to interact with the target passenger, a close-distance accurate recommendation is performed on the automatic driving vehicle and the target passenger, and thus the riding success rate and the riding efficiency are further improved.

According to the embodiments of the present disclosure, the present disclosure further provides an electronic device, a readable storage medium, and a computer program product.

Figure 6:
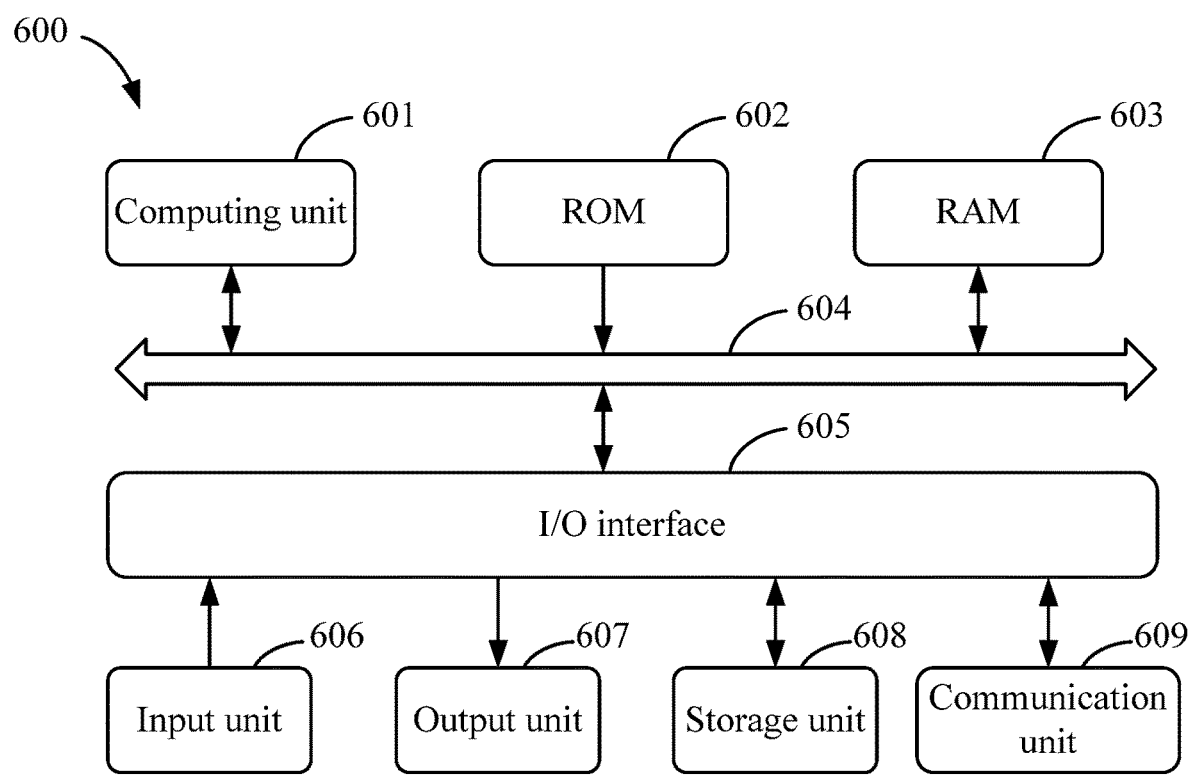
FIG. 6 is a block diagram of an electronic device for implementing an automatic driving-based riding method of an embodiment of the present disclosure.

FIG. 6 shows a schematic block diagram of an example electronic device 600 that may be used for implementing the embodiments of the present disclosure. The electronic device is intended to represent various forms of digital computers, such as laptops, desktops, workstations, personal digital assistants, servers, blade servers, mainframes, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be examples merely, and are not intended to limit implementations of the present disclosure described and/or claimed herein.

As shown in FIG. 6, the device 600 includes a computing unit 601, the computing unit 601 may perform various suitable actions and processes according to a computer program stored in a read only memory (ROM) 602 or loaded from a storage unit 608 into a random access memory (RAM) 603. In the RAM 603, various programs and data necessary for the operation of the device 600 may also be stored. The computing unit 601, the ROM 602, and the RAM 603 are connected to each other via a bus 604. An input/output (I/O) interface 605 is also connected to the bus 604.

A number of components in the device 600 are connected to the I/O interface 605, which includes: an input unit 606 such as a keyboard, a mouse; an output unit 607 such as various types of displays, speakers; a storage unit 608 such as a magnetic disk, an optical disk; and a communication unit 609 such as a network card, a modem, a wireless communication transceiver. The communication unit 609 allows the device 600 to exchange information/data with other devices via a computer network such as the internet and/or various telecommunication networks.

The computing unit 601 may be a variety of general purpose and/or specialized processing assemblies having processing and computing capabilities. Some examples of the computing unit 601 include, but are not limited to, a central processing unit (CPU), a graphics processing unit (GPU), various dedicated artificial intelligence (AI) computing chips, various computing units that execute a machine learning model algorithm, a digital information processor (DSP), and any suitable processor, controller, microcontroller, and the like. The computing unit 601 performs the various methods and processes described above, for example, performs an automatic driving-based riding method. For example, in some embodiments, the automatic driving-based riding method may be implemented as a computer software program, which is tangibly embodied in a machine-readable medium, such as the storage unit 608. In some embodiments, part or all of computer programs may be loaded and/or installed onto the device 600 via the ROM 602 and/or the communication unit 609. When the computer program is loaded into the RAM 603 and executed by the computing unit 601, one or more steps of the automatic driving-based riding method described above may be executed. Alternatively, in other embodiments, the computing unit 601 may be configured to perform, in any other suitable manner (such as, by means of a firmware), the automatic driving-based riding method.

Various implementations of the systems and techniques described herein above may be realized in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or combinations thereof. These various implementations may include an implementation in one or more computer programs, and the one or more computer programs are executable and/or interpretable on a programmable system including at least one programmable processor, the programmable processor may be a special or general purpose programmable processor, data and instructions may be received from and transmitted to a storage system, at least one input apparatus, and at least one output apparatus.

Program codes for implementing the method of the present disclosure may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowchart and/or block diagram to be implemented. The program codes may execute entirely on a machine, partly on the machine, as a stand-alone software package partly on the machine and partly on a remote machine or entirely on the remote machine or a server.

In the context of the present disclosure, a machine readable medium may be a tangible medium that may contain or store a program for use by or in connection with an instruction execution system, an apparatus, or a device. The machine readable medium may be a machine readable signal medium or a machine readable storage medium. The machine readable medium may include, but not be limited to, an electronic, magnetic, optical, electromagnetic, infrared, or semiconductor system, apparatus, or device, or any suitable combination of the foregoing. More specific examples of the machine readable storage medium would include an electrical connection based on one or more wires, a portable computer diskette, a hard disk, a random-access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide for interaction with a user, the system and technique described here may be implemented on a computer, the computer has a display apparatus (such as, a cathode ray tube (CRT) or liquid crystal display (LCD) monitor) for displaying information to the user; and a keyboard and a pointing apparatus (e.g., a mouse or trackball) by which the user may provide an input to the computer. Other kinds of apparatuses may also be used for providing for an interaction with the user as well; for example, a feedback provided to the user may be any form of sensory feedback (such as, a visual feedback, an auditory feedback, or a tactile feedback); and an input from the user may be received in any form (including an acoustic input, a speech input, or a tactile input).

The systems and techniques described here may be implemented in a computing system that includes a background component (e.g., as a data server), or that includes a middleware component (e.g., an application server), or that includes a front end component (e.g., a user computer having a graphical user interface or a web browser, the user may interact with an implementation of the system and technique described here through the graphical user interface or the web browser), or may be implemented in a computing system that includes any combination of such background component, middleware component, or front end component. The components of the system may be interconnected by any form or medium of digital data communication (such as a communication network). Examples of the communication network include a local area network (LAN), a wide area network (WAN), a blockchain network, and the Internet.

A computer system may include a client and a server. The client and server are generally remote from each other and typically interact through the communication network. The relationship between the client and the server arises by virtue of computer programs executing on the respective computers and having a client-server relationship to each other. The server may be a cloud server, also referred to as a cloud computing server or a cloud host, and is a host product in a cloud computing service system, so that the defects of high management difficulty and weak business expansibility in a traditional physical host and a VPS service are overcome.

It should be understood that various forms of flows, reordering, adding or deleting steps shown above may be used. For example, the steps recited in the present disclosure may be executed in parallel, sequentially, or in different orders, and are not limited herein as long as the desired results of the technical schemes disclosed in the present disclosure may be achieved.

The above detailed description should not be construed as limiting the scope of protection of the present disclosure. It should be understood by those skilled in the art that various modifications, combinations, sub-combinations and substitutions may be made depending on design requirements and other factors. Any modification, equivalent replacement and improvement made within the spirit and principle of the present disclosure should be included in the scope of protection of the present disclosure.

What is claimed is:

1. An automatic driving-based riding method, comprising:
selecting a target pick-up point for a target passenger from candidate pick-up points according to vehicle auxiliary information of the candidate pick-up points, wherein the vehicle auxiliary information of the candidate pick-up points comprises coordinate information and lane information of the candidate pick-up points; and
controlling an automatic driving vehicle to drive to the target pick-up point according to vehicle auxiliary information of the target pick-up point;
wherein before the selecting the target pick-up point for the target passenger from the candidate pick-up points, the method further comprises:
acquiring, in a non-automatic driving scene, coordinate information and semantic description information of a historical pick-up point of a historical passenger, and a movement track of the historical passenger before a riding;
correcting the coordinate information of the historical pick-up point according to the movement track, and determining the coordinate information and the lane information of the candidate pick-up points according to a corrected result; and
adjusting the semantic description information of the historical pick-up point according to the coordinate information of the candidate pick-up points to obtain semantic description information of the candidate pick-up points.

2. The method of claim 1, wherein the selecting the target pick-up point for the target passenger from the candidate pick-up points according to the vehicle auxiliary information of the candidate pick-up points comprises:
screening the candidate pick-up points according to an initial position of the target passenger and the vehicle auxiliary information of the candidate pick-up points; and
sorting the screened candidate pick-up points according to an automatic driving feature of the candidate pick-up points, and selecting the target pick-up point for the target passenger according to a sorted result.

3. The method of claim 2, wherein the automatic driving feature comprises at least one of: an automatic driving success rate, a road condition complexity, or passenger feedback information.

4. The method of claim 1, wherein before the selecting the target pick-up point for the target passenger from the candidate pick-up points, the method further comprises:
acquiring semantic description information and coordinate information of a point of interest (POI);
matching the coordinate information of the POI with a lane in a road network to obtain a mapping point of the POI on the lane; and
determining the coordinate information and the lane information of the candidate pick-up points according to coordinate information and lane information of the mapping point, and determining semantic description information of the candidate pick-up points according to the semantic description information of the POI.

5. The method of claim 4, wherein the determining the coordinate information and the lane information of the candidate pick-up points according to the coordinate information and the lane information of the mapping point, and determining the semantic description information of the candidate pick-up points according to the semantic description information of the POI comprises:
in a case where the mapping point belongs to a riding prohibition region, correcting at least one of the coordinate information or the lane information of the mapping point to obtain at least one of the coordinate information or the lane information of the candidate pick-up points; and adjusting the semantic description information of the POI according to at least one of the coordinate information or the lane information of the candidate pick-up points to obtain the semantic description information of the candidate pick-up points.

6. The method of claim 1, wherein before the selecting the target pick-up point for the target passenger from the candidate pick-up points, the method further comprises:
using an actual pick-up point of the historical passenger in an automatic driving riding scene as the candidate pick-up points, and obtaining the coordinate information, the lane information and semantic description information of the candidate pick-up points.

7. The method of claim 1, wherein after the controlling the automatic driving vehicle to drive to the target pick-up point according to the vehicle auxiliary information of the target pick-up point, the method further comprises:
in a case where the automatic driving vehicle arrives at the target pick-up point and the target passenger does not arrive at the target pick-up point, controlling the automatic driving vehicle to acquire a vehicle environment image, and sending the vehicle environment image to the target passenger for assisting the target passenger in positioning the automatic driving vehicle.

8. The method of claim 1, wherein after the controlling the automatic driving vehicle to drive to the target pick-up point according to the vehicle auxiliary information of the target pick-up point, the method further comprises:
in a case where the automatic driving vehicle arrives at the target pick-up point and the target passenger does not arrive at the target pick-up point, controlling the automatic driving vehicle to interact with the target passenger, and generating a candidate instruction according to interaction information;
sending inquiry information about whether to execute the candidate instruction to the target passenger; and
after the target passenger confirms that the candidate instruction is executed, controlling the automatic driving vehicle to execute the candidate instruction to adjust position information of the automatic driving vehicle.

9. An electronic device, comprising:
at least one processor; and
a memory communicatively connected to the at least one processor;
wherein the memory stores an instruction executable by the at least one processor, and the instruction, when executed by the at least one processor, causes the at least one processor to perform an automatic driving-based riding method, wherein the method comprises:
selecting a target pick-up point for a target passenger from candidate pick-up points according to vehicle auxiliary information of the candidate pick-up points, wherein the vehicle auxiliary information of the candidate pick-up points comprises coordinate information and lane information of the candidate pick-up points; and
controlling an automatic driving vehicle to drive to the target pick-up point according to vehicle auxiliary information of the target pick-up point;
wherein before the selecting the target pick-up point for the target passenger from the candidate pick-up points, the method further comprises:
acquiring, in a non-automatic driving scene, coordinate information and semantic description information of a historical pick-up point of a historical passenger, and a movement track of the historical passenger before a riding;

correcting the coordinate information of the historical pick-up point according to the movement track, and determining the coordinate information and the lane information of the candidate pick-up points according to a corrected result; and adjusting the semantic description information of the historical pick-up point according to the coordinate information of the candidate pick-up points to obtain semantic description information of the candidate pick-up points.

10. A non-transitory computer readable storage medium storing a computer instruction, wherein the computer instruction is configured to cause a computer to perform the method of claim 1.

11. The electronic device of claim 9, wherein the selecting the target pick-up point for the target passenger from the candidate pick-up points according to the vehicle auxiliary information of the candidate pick-up points comprises:

screening the candidate pick-up points according to an initial position of the target passenger and the vehicle auxiliary information of the candidate pick-up points; and sorting the screened candidate pick-up points according to an automatic driving feature of the candidate pick-up points, and selecting the target pick-up point for the target passenger according to a sorted result.

12. The electronic device of claim 11, wherein the automatic driving feature comprises at least one of: an automatic driving success rate, a road condition complexity, or passenger feedback information.

13. The electronic device of claim 9, wherein before the selecting the target pick-up point for the target passenger from the candidate pick-up points, the method further comprises:

acquiring semantic description information and coordinate information of a point of interest (POI);

matching the coordinate information of the POI with a lane in a road network to obtain a mapping point of the POI on the lane; and determining the coordinate information and the lane information of the candidate pick-up points according to coordinate information and lane information of the mapping point, and determining semantic description information of the candidate pick-up points according to the semantic description information of the POI.

14. The electronic device of claim 13, wherein the determining the coordinate information and the lane information of the candidate pick-up points according to the coordinate information and the lane information of the mapping point, and determining the semantic description information of the candidate pick-up points according to the semantic description information of the POI comprises:

in a case where the mapping point belongs to a riding prohibition region, correcting at least one of the coordinate information or the lane information of the mapping point to obtain at least one of the coordinate information or the lane information of the candidate pick-up points; and adjusting the semantic description information of the POI according to at least one of the coordinate information or the lane information of the candidate pick-up points to obtain the semantic description information of the candidate pick-up points.

15. The electronic device of claim 9, wherein before the selecting the target pick-up point for the target passenger from the candidate pick-up points, the method further comprises:

using an actual pick-up point of the historical passenger in an automatic driving riding scene as the candidate pick-up points, and obtaining the coordinate information, the lane information and semantic description information of the candidate pick-up points.

16. The electronic device of claim 9, wherein after the controlling the automatic driving vehicle to drive to the target pick-up point according to the vehicle auxiliary information of the target pick-up point, the method further comprises:

in a case where the automatic driving vehicle arrives at the target pick-up point and the target passenger does not arrive at the target pick-up point, controlling the automatic driving vehicle to acquire a vehicle environment image, and sending the vehicle environment image to the target passenger for assisting the target passenger in positioning the automatic driving vehicle.

17. The electronic device of claim 9, wherein after the controlling the automatic driving vehicle to drive to the target pick-up point according to the vehicle auxiliary information of the target pick-up point, the method further comprises:

in a case where the automatic driving vehicle arrives at the target pick-up point and the target passenger does not arrive at the target pick-up point, controlling the automatic driving vehicle to interact with the target passenger, and generating a candidate instruction according to interaction information;

sending inquiry information about whether to execute the candidate instruction to the target passenger; and after the target passenger confirms that the candidate instruction is executed, controlling the automatic driving vehicle to execute the candidate instruction to adjust position information of the automatic driving vehicle.

* * * * *